(No Model.) 3 Sheets—Sheet 1.
S. G. SEVIER.
PLOW.
No. 549,827. Patented Nov. 12, 1895.
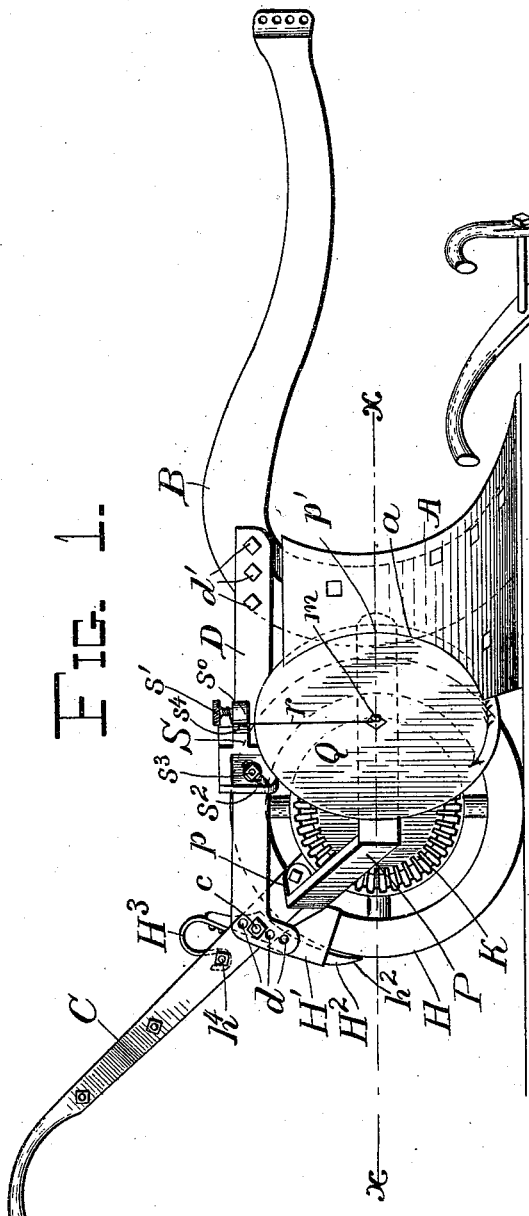
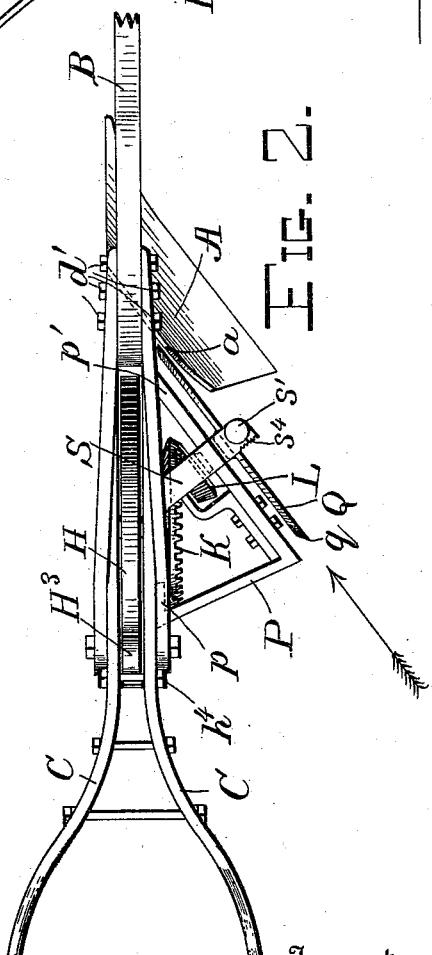
Witnesses
Percy C. Bowen
J. C. Wilson
Inventor
S. G. Sevier,
By Whitman & Wilkinson,
Attorneys.

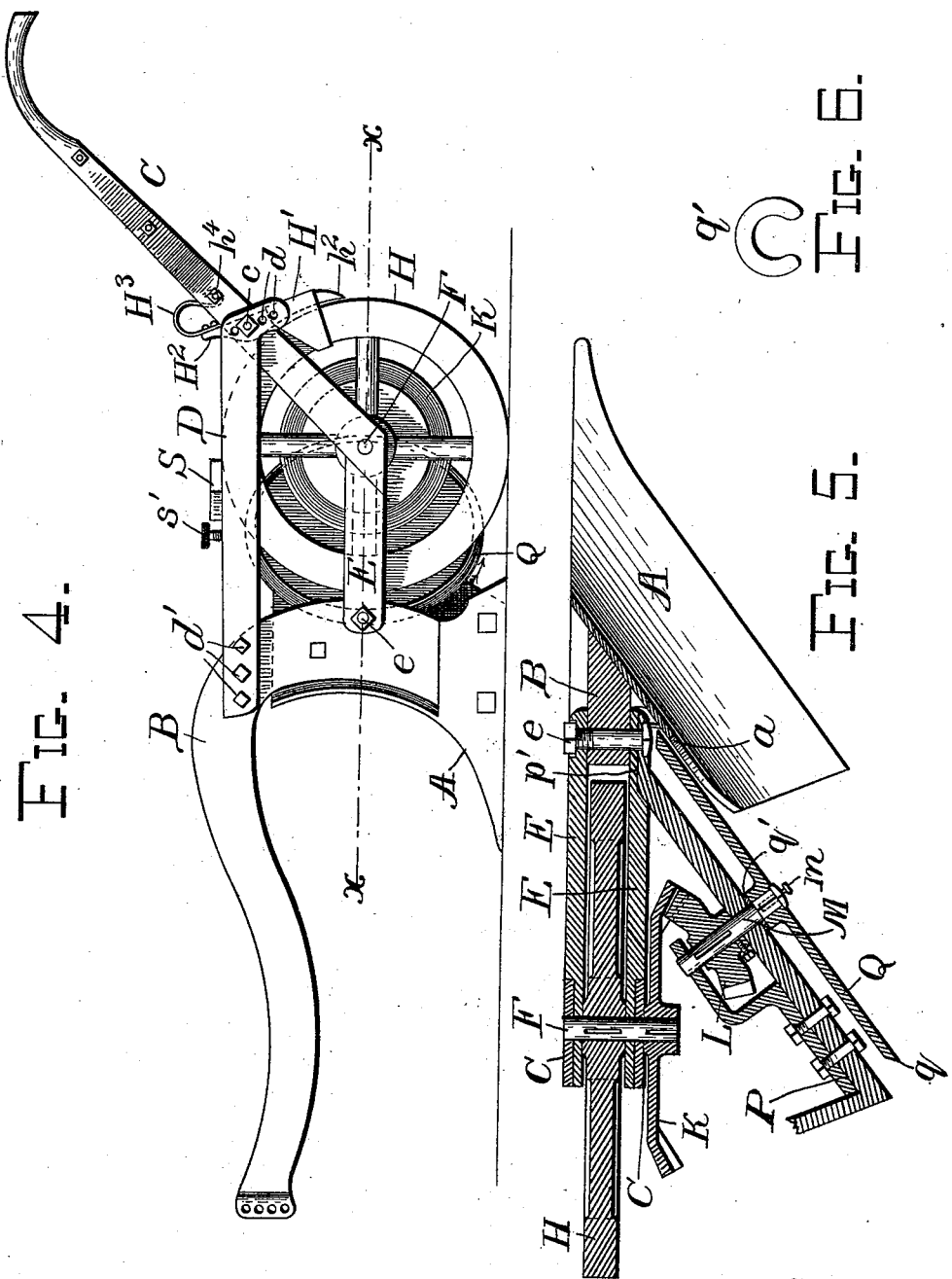

(No Model.) 3 Sheets—Sheet 3.

S. G. SEVIER.
PLOW.

No. 549,827. Patented Nov. 12, 1895.

Witnesses
Percy C. Bowen
J. C. Wilson

Inventor
S. G. Sevier,
By Whitman & Wilkinson
Attorneys

UNITED STATES PATENT OFFICE.

SAMUEL G. SEVIER, OF OENAVILLE, TEXAS.

PLOW.

SPECIFICATION forming part of Letters Patent No. 549,827, dated November 12, 1895.

Application filed December 3, 1894. Serial No. 530,728. (No model.)

*To all whom it may concern:*

Be it known that I, SAMUEL G. SEVIER, a citizen of the United States, residing at Oenaville, in the county of Bell and State of Texas, have invented certain new and useful Improvements in Plows; and I do hereby declare the following to be a full, clear, and exact description of the invention, such as will enable others skilled in the art to which it appertains to make and use the same.

My invention relates to improvements in plows; and it consists, especially, of the revolving moldboard and the parts for operating and cleaning the same, which will be hereinafter described and claimed.

Reference is had to the accompanying drawings, wherein the same parts are indicated by the same letters.

Figure 9:
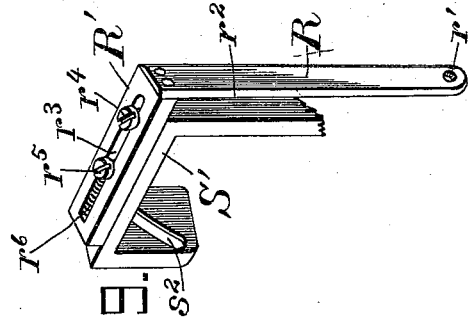
Figure 8:
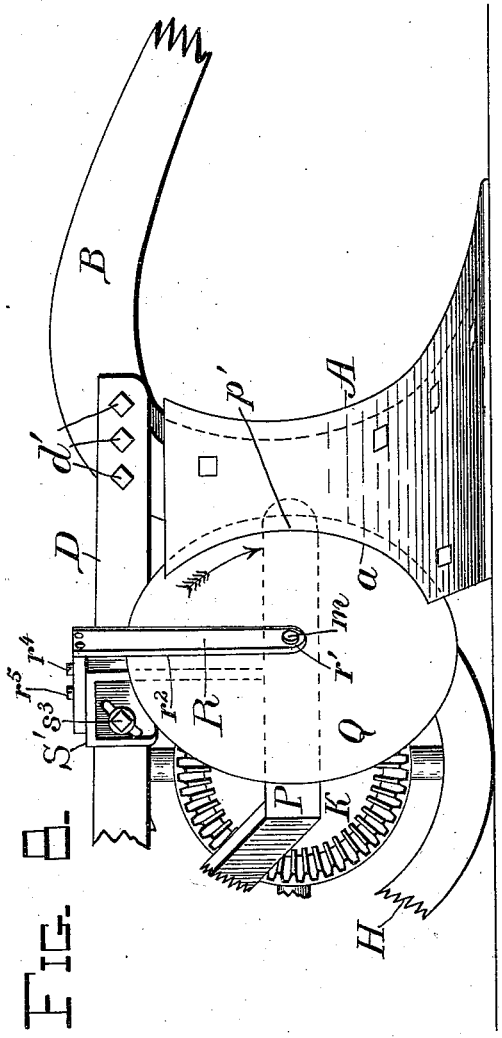
Figure 7:
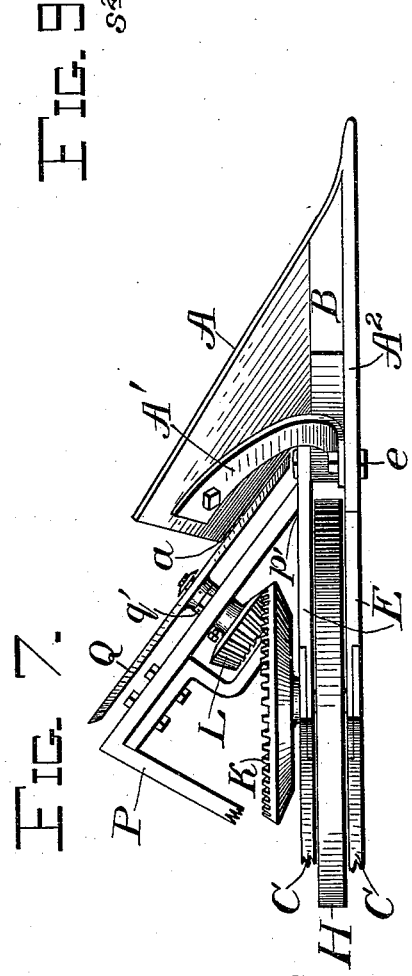

Figure 1 represents a side elevation of the plow. Fig. 2 represents a plan view of the same. Fig. 3 is a perspective view as seen from the rear and right. Fig. 4 represents an elevation of the plow from the opposite side from that shown in Fig. 1. Fig. 5 represents a section made by the plane $x$ $x$ of Figs. 1 and 4 and looking down, and Fig. 6 represents a side elevation of one of the detachable washers used in adjusting the face of the revolving moldboard. Fig. 7 represents an inverted plan view of the plowshare and attachments. Fig. 8 is a similar view to Fig. 1, but showing another form of cleaning device for the revolving moldboard, and Fig. 9 represents a detail perspective view of the knife for cleaning off the moldboard and the manner of attaching the same to the plow.

A represents the stationary moldboard, which is cut away, as at $a$, in front of the revolving disk Q, and is secured to the landside $A^2$ by the curved piece A'.

B represents the plow-beam to which the moldboard and plowshare are attached.

C represents the handles, which are connected by the bolt $c$, which passes through one of the holes $d$ to the frame D, which is rigidly attached by means of the bolts $d'$ to the beam B. The lower ends of the handles are connected to the frame E, and the forward end of the said frame is secured by means of the bolt $e$ to the beam B.

The shaft F passes through the junction of the frame E and the handles C and assists in securing them together, while keyed on said shaft is the wheel H, which revolves from contact with the ground and the gear-wheel K. This gear-wheel meshes in a similar gear-wheel L, keyed on the shaft M, which carries the revolving moldboard Q, which moldboard has a sharp edge $q$, as shown most clearly in Figs. 3 and 5. The distance of the outer face of the revolving moldboard Q from the rear face of the fixed moldboard is adjusted by means of one or more horseshoe-shaped washers $q'$. (Shown in detail in Fig. 6.) If this washer be placed between the frame P and the moldboard Q, then it will be evident that the revolving moldboard will be closest to the fixed moldboard, and if it be placed between the frame P and the gear-wheel L, then the revolving moldboard will be at some distance from the fixed moldboard. These adjustments are desirable, since the frame P is moved about a pivot, thus varying the distance between the fixed and revolving mold-boards. This shaft M is journaled in the frame P, which is attached at $p$ to the handles C and at $p'$ is pivoted to the beam B by the bolt $e$, or the frame P may be made integral with the adjacent half of the frame E. Moreover, it is supported by the frame S, (shown in Figs. 1 to 4,) or S'. (Shown in Figs. 7 and 8.) In either case the frame is bent over and secured to the frame D by a bolt $s^3$, passing through the diagonal slot $s^2$ in the bent-over portion of the frame, the said bolt $s^3$ being held by a nut in position on the frame D.

In the device shown in Figs. 1 to 5 the frame S is provided with a projecting arm $s^0$, which is dentated, as at $s^4$, to receive the wire $r$, which is wound around the screw $s'$ and is secured to the neck of the stud $m$, which stud is fast to the shaft M and revolves freely within the loop formed at the end of the said wire $r$.

It will be seen that the wire may be led into any one of these notches $s^4$, and thus its distance from the face of the revolving moldboard Q may be varied at will. The function of this wire is to scrape off clods of dirt or other matter that might adhere to the revolving moldboard. Instead of this wire, however, I preferably use the knife R. (Shown in Figs. 8 and 9.) This knife is provided with a bearing $r'$ to receive the pin $m$, and has a cutting-edge $r^2$, adapted to scrape the soil off the revolving moldboard. The upper end of this knife is attached to a sliding frame R′, which is slotted, as at $r^3$, to admit the shanks of the two holding-screws $r^4$ and $r^5$, and between the screw $r^5$ and the end of the slot a spring $r^6$ is interposed, which spring tends to draw the knife toward the face of the revolving moldboard and yet to allow the knife to yield outward when necessary.

The frame R′ is mounted on the frame S′, similar to the frame S already described, except that the arm $s^0$ is omitted.

The driving-wheel H is kept clean by means of the plate H′, secured to the handles C, and the scraper $H^2$, which is sharpened, as at $h^2$, and is pressed toward the periphery of the wheel by the spring $H^3$. This spring is secured to the plow-handles, as at $h^4$, and also to the upper end of the scraper $H^2$, the said scraper being pivoted on the bolt $c$.

The object of having the plurality of holes $d$ for the said bolt is to raise or lower the wheel H relative to the plow, and thus to raise or lower the point of the plow for shallow or deep plowing.

The operation of the device will be evident from an inspection of the drawings.

It will be seen that the driving-gear is well protected and is not likely to become clogged up with grass, weeds, or dirt, that the point of the plow may be readily and rapidly adjusted, and that the scraper $H^2$ will yield to excessive pressure and may be readily cleaned off, if choked, by the plowman. These and the various other advantages of the herein-described construction will readily suggest themselves to any one skilled in the art.

It will be obvious that various modifications might be made which could be used without departing from the spirit of my invention.

Having thus described my invention, what I claim, and desire to secure by Letters Patent of the United States, is—

1. In a plow, the combination with a driving wheel mounted in bearings vertically adjustable relative to the plow share, in rear thereof, a gear wheel driven thereby, a revolving circular mold board, and a smaller gear wheel interposed between said revolving moldboard and the first gear wheel, for driving the said mold board, substantially as and for the purposes described.

2. In a plow, the combination with a driving wheel mounted in bearings in rear of the plow share; a scraper, and a spring normally pressing said scraper on said driving wheel; a gear wheel driven by said driving wheel; a revolving mold board, and a second gear wheel interposed between said revolving moldboard and the first gear wheel, for driving the said moldboard, substantially as and for the purposes described.

3. In a plow, the combination with a beam and a fixed mold board and plow share connected thereto, of the frame D fixed to and the frame E pivoted to said beam; the handles C pivotally connected to said frame D and also connected to said frame E, the frame P connected to the beam and plow handles, and the frame S connecting said frame P with said frame D, the driving wheel H and gear wheel K journaled in said frame E and in the lower ends of said handles, and the gear wheel L and revolving moldboard Q journaled in said frame P, substantially as and for the purposes described.

4. In a plow, the combination with a beam and a fixed mold board and plow share connected thereto, of the frame D fixed to and the frame E pivoted to said beam; the handles C pivotally connected to said frame D and also connected to said frame E, the frame P connected to the beam and plow handles; and the frame S connecting said frame P with said frame D; the shaft F journaled in the rear end of said frame E and in the lower end of said handles and securing the said frame and the handles together, the driving wheel H and the gear-wheel K fast on said shaft F; the shaft M journaled in said frame P and the revolving moldboard Q and gear wheel L fast on said shaft L, substantially as and for the purposes described.

5. In a plow, the combination with a beam and a fixed mold board and plow share connected thereto, of the frame D fixed to and the frame E pivoted to said beam; the handles C pivotally connected to said frame D and also connected to said frame E, the frame P connected to the beam and plow handles, and the frame S connecting said frame P with said frame D, the driving wheel H and gear wheel K journaled in said frame E and in the lower ends of said handles, the gear wheel L and revolving moldboard Q journaled in said frame P, and the horseshoe-shaped washer interposed between said revolving moldboard and said wheel L, substantially as and for the purposes described.

6. In a plow, the combination with a beam and a fixed mold board and plow share connected thereto, of the frame D fixed to and the frame E pivoted to said beam; the handles C pivotally connected to said frame D and also connected to said frame E, the frame P connected to the beam and plow handles; and the frame S connecting said frame P with said frame D; the shaft F journaled in the rear end of said frame E and in the lower end of said handles and securing the said frame and the handles together, the driving wheel H and the gear wheel K fast on said shaft F; the shaft L journaled in said frame P, the revolving mold board Q and gear wheel L fast on said shaft M; and the horseshoe-shaped washer mounted on said shaft M between the mold board Q and the gear wheel L, substantially as and for the purposes described.

7. In a plow of the character described, the combination with the revolving mold board Q, and central pivot $m$ of the knife R connected near one end to said pivot, an adjustable frame attached to the other end of said knife, and a spring normally pressing on said frame so as to bring said knife close against the face of the revolving mold board, substantially as described.

8. In a plow of the character described, the combination with the revolving mold board Q, and central pivot $m$ of the knife R connected near one end to said pivot, the slotted frame R' attached to the other end of said knife, the screws $r^4$ and $r^5$ projecting into said slot and connected to the frame work of the plow, and a spring $r^6$ interposed between said screw $r^5$, and the end of said slot, for bringing said knife close against the face of said revolving mold board, substantially as described.

In testimony whereof I affix my signature in presence of two witnesses.

SAMUEL G. SEVIER.

Witnesses:
WM. S. ELLIOTT,
WM. E. ROY.